United States Patent
Angwin (10) Patent No.: US 8,949,375 B2
(45) Date of Patent: Feb. 3, 2015

(54) DATA PROCESSING OF MEDIA FILE TYPES SUPPORTED BY CLIENT DEVICES

(75) Inventor: Alastair Angwin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1921 days.

(21) Appl. No.: 11/777,353

(22) Filed: Jul. 13, 2007

(65) Prior Publication Data

US 2008/0086525 A1 Apr. 10, 2008

(30) Foreign Application Priority Data

Oct. 7, 2006 (GB) .................................. 0619887.3

(51) Int. Cl.
*G06F 15/16* (2006.01)
*G06F 7/00* (2006.01)
*G06F 17/30* (2006.01)
*H04L 29/08* (2006.01)

(52) U.S. Cl.
CPC ...... *G06F 17/30876* (2013.01); *H04L 67/2814* (2013.01); *H04L 67/02* (2013.01)
USPC ............................ 709/218; 709/203; 707/722

(58) Field of Classification Search
CPC ................................ G06F 17/00; H04L 67/00
USPC ............................ 709/218, 203; 707/E17.112
See application file for complete search history.

(56) References Cited

U.S. PATENT DOCUMENTS

| | | | |
|---|---|---|---|
| 7,051,040 B2 | 5/2006 | Easwar | |
| 2003/0008650 A1* | 1/2003 | Matsuyama et al. | 455/426 |
| 2003/0161298 A1* | 8/2003 | Bergman et al. | 370/352 |
| 2003/0225569 A1* | 12/2003 | Shimamura | 704/2 |
| 2004/0003056 A1* | 1/2004 | Yamaguchi et al. | 709/219 |
| 2004/0148362 A1* | 7/2004 | Friedman | 709/217 |
| 2005/0148367 A1* | 7/2005 | Natsuno | 455/558 |
| 2006/0015559 A1* | 1/2006 | Yabe et al. | 709/206 |
| 2006/0068818 A1* | 3/2006 | Leitersdorf et al. | 455/466 |
| 2006/0136556 A1* | 6/2006 | Stevens et al. | 709/203 |
| 2006/0218234 A1* | 9/2006 | Deng et al. | 709/206 |
| 2006/0253594 A1* | 11/2006 | Szabo et al. | 709/227 |
| 2007/0208669 A1* | 9/2007 | Rivette et al. | 705/59 |
| 2008/0195758 A1* | 8/2008 | Nageswara et al. | 709/246 |

FOREIGN PATENT DOCUMENTS

EP 1170675 A1 1/2002

OTHER PUBLICATIONS

IBM, Including URL to Media Key Block in Encrypted Content Header, Technical Disclosure IPCOM000030992D, Sep. 3, 2004, pp. 1-8, IP.com, Published online at: http://ip.com/IPCOM/000030992.

* cited by examiner

*Primary Examiner* — Ebrahim Golabbakhsh

(74) *Attorney, Agent, or Firm* — Lee Law, PLLC; Christopher B. Lee (57) ABSTRACT

A data processing system comprises a client device, a server system and a network connecting the client device to the server system. The client device is arranged to transmit a data request to the server system, the data request including a URL pointer to a repository address. The server system is arranged to receive the data request, to access the repository address defined by the URL pointer, and to receive data from the repository address, the data defining a plurality of media file types supported by the client device.

9 Claims, 6 Drawing Sheets

Fig. 8

DATA PROCESSING OF MEDIA FILE TYPES SUPPORTED BY CLIENT DEVICES

FIELD AND BACKGROUND OF INVENTION

This invention relates to a data processing system. The system can be operated to provide improved HTTP (Hypertext Transfer Protocol, see RFC2616, R. Fielding et al., June 1999 www.ietf.org/rfc/rfc2616.txt) content accept negotiation.

In networks such as the Internet, the communication between a client device and a server system can be via a protocol such as HTTP. Today's HTTP negotiation consists of clients, e.g. browsers run by computers, advertising the supported content types through the "accept" header. The intention is that the client device advertises the content types that it supports to allow the application server and other infrastructure components to understand the capabilities of the device and supply only content that can be rendered correctly.

Incomplete or incorrect negotiation risks content being supplied to the client device that is not supported and therefore cannot be rendered, hence on a display device some graphics may not being rendered and users may see only an empty box with an "x" or message in it informing the user that content is not presented. In order to keep HTTP headers short and therefore improve performance by reducing request latency there is a temptation for a client device to advertise the supported content types as */*, i.e. that the device supports all media types, which may be true for the most powerful clients such as personal computer based browsers but certainly isn't the case for constrained devices such as mobile phones. The risks of this route (using */*) or any compromise in the completeness of the accept header declaration is already stated and leads to dissatisfied users of services.

A mechanism called CC/PP ("Composite Capability/Preference Profiles (CC/PP): Structure and Vocabularies", G. Klyne, F. Reynolds, C Woodrow, H. Ohto, www.w3c.org/TR/CCPP-struct-vocab) and its application UAPROF ("OMA User Agent Profile v2.0", Open Mobile Alliance OMA-TS-UAProf-v2_0-20060206-A.pdf, www.openmobilealliance.org) improve matters by allowing every device characteristic to be described in a machine-readable document whose availability is advertised in the HTTP header.

In a perfect world, the UAPROF approach addresses the problem of the accept header and obtaining a complete understanding of the client device's characteristics and capabilities to provide content that matches these capabilities. However, the reality is that UAPROF has performance implications, because, for example, it requires parsing of the machine-readable documents on the server side. Further, this system has problems when the URIs (Uniform Resource Identifiers, see URI Generic Syntax", T. Berners-Lee, R. Fielding, L. Masinter, January 2005, www.ietf.org/rfc/rfc3986.txt) are not URLs (The URI reference above updates and informatively references "Uniform Resource Locators (URL)", T. Berners-Lee, L. Masinter, M. McCahill, December 1994, www.ietf.org/rfc/rfc1738.txt), i.e. the profiles cannot be fetched or are invalid. While the market is gradually adopting UAPROF it will take time for it to become supported mainstream in all application servers.

SUMMARY OF THE INVENTION

With the foregoing in mind, it is one purposes of this invention, according to a first aspect of the present invention, to provide a data processing system comprising a client device, a server system and a network connecting the client device to the server system, the client device arranged to transmit a data request to the server system, the data request including a URL pointer to a repository address, the server system arranged to receive the data request, to access the repository address defined by the URL pointer, and to receive data from the repository address, the data defining a plurality of media file types supported by the client device.

According to a second aspect of the present invention, there is provided a method of operating a data processing system, the system comprising a client device, a server system and a network connecting the client device to the server system, the method comprising transmitting a data request from the client device to the server system, the data request including a URL pointer to a repository address, receiving the data request at the server system, accessing the repository address defined by the URL pointer, and receiving data from the repository address, the data defining a plurality of media file types supported by the client device.

Owing to the invention, it is possible to provide a simple solution to the problem of an efficient notification of the client device's capabilities in respect of the media file types that the client device supports.

The approach simply requires that the client device provides a URL in the header of the data request, either to replace the accept header or in addition to the accept header, which points to a location that provides a full list of the content types supported, for example, an entry in a device supported content types repository. This list can be a simple list of the content types as would be presented in the accept header when fully declared along with the usual quality factors etc, though ideally it would be in an XML format. The client device could then advertise support for */* along with this supported content types URL at one extreme or a short list of the dominant content types, for example text/html.

To reduce any conflict between the full accepted content types pointed to by this header in the URL and the list of accept headers provided directly in the request, the accept header the HTTP "q" parameter, could be used with a value of less than 1 for the accept header values, for example, accept: */*; q=0.5. An update mechanism such as OMAs XML Document Management or a device management function could be used to ensure currency of this list held at the supported content types URL.

Advantageously, the server system comprises a repository and a server, and can further comprise a proxy server. The proxy server can be arranged to replace the URL pointer in the data request with the data from the repository address. The data request comprises an HTTP request, and a header of the HTTP request includes the URL pointer to the repository address. The data received back from the repository can be a simple text file that lists the media types supported, which does not require any parsing to obtain the data.

Preferably, the data request further comprises data defining one or more media file types supported by the client device. The data request traveling from the client device to the server system can include, in addition to the URL pointer, one or more very common file types, in order to allow the server side of the system to respond, if the repository information cannot be recalled correctly, or within sufficient time.

Ideally, the server system is arranged to transmit a response to the client device, the response adapted according to the data received from the repository address. The information which is recalled by the server system from the repository details the file types supported by the client device, and this information is used to format the response sent back to the client device. This will mean that only formats understood by the client device will be used when sending a response to the device. So a lightweight device such as a mobile phone will be able to render all of the contents of the response from the server side, as the response is tailored to the functionality of that device.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
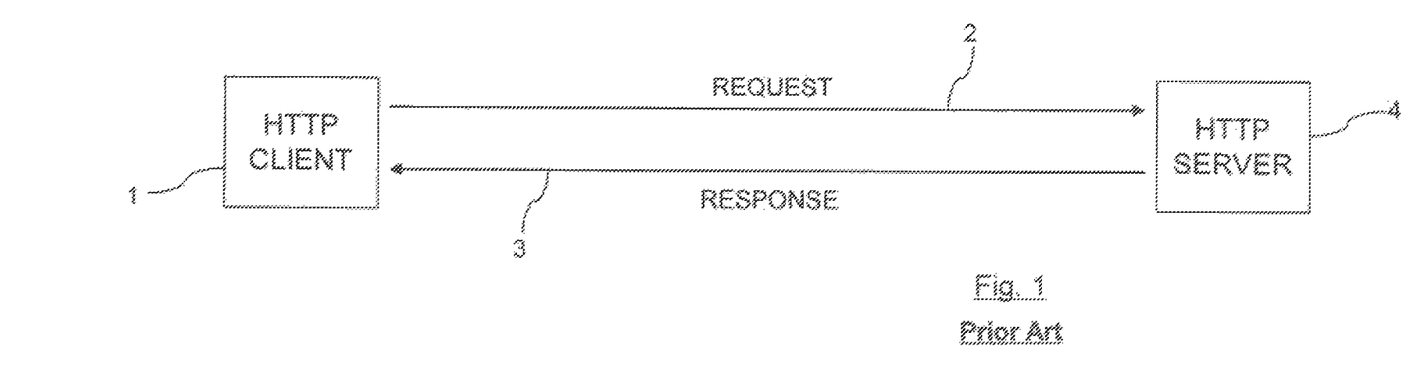
FIGS. 1 to 4 are schematic diagrams of prior art data processing systems.

FIG. 1 shows a (prior art) basic HTTP (HTTP/1.1) flow with a client device 1 sending a request 2 and receiving a response 3 from a server 4. The client device 1 can be a conventional PC running a standard browser, which has made a request for information from the specific HTTP server 4 via a network such as the Internet. The request 2 will include within it a request header as a standard component according to the HTTP protocol.

A typical request header contained within the request 2 might look like the following, which would be used for example, if the browser is Internet Explorer 6.0 and is accessing the website http://www.openmobilealliance.org which is stored on the server 4.

---

HTTP Request Header (Length = 414)
GET / HTTP / 1.1
Accept: image/gif, image/x-xbitmap, image/jpeg, image/pjpeg, application/x-shockwave-flash, application/vnd.ms-excel, application/vnd.ms-powerpoint, application/msword, */*
Accept-Language: en-gb
Accept-Encoding: gzip, deflate
User-Agent: Mozilla/4.0 (compatible; MSIE 6.0; Windows NT 5.1; SV1; .NET CLR 1.1.4322; .NET CLR 2.0.50727)
Host: www.openmobilealliance.org
Connection: Keep-Alive

---

The corresponding HTTP header response, not the rendered data, for the above request could look like this:

---

HTTP Reply Header (Length = 383)
HTTP / 1.1 200 OK

-continued

Server: Microsoft-IIS/5.0
Content-Location: http://www.openmobilealliance.org/index.html
Date: Thu, 28 Sep 2006 13:22:05 GMT
Content-Type: text/html
Accept-Ranges: bytes
Last-Modified: Mon, 18 Sep 2006 14:24:44 GMT
ETag: "582ab82f2edbc61:bbc"
Content-Length: 14752
Via: 1.1 Application and Content Networking System Software 5.3.5
Connection: Keep-Alive

---

The request header shows the content types that the HTTP client device 1 will accept, namely image/gif, image/x-xbitmap, image/jpeg, image/pjpeg, application/x-shockwave-flash, application/vnd.ms-excel, application/vnd.ms-powerpoint, application/msword, */*. In this example, the HTTP client device 1 is advertising three image types, and flash, word, excel and PowerPoint capabilities, although it does not indicate any of the specific markup languages (HTML, XHTML etc.) or scripts, yet the client device 1 does support them. These others formats are covered by the "*/*" contained within the header.

In the case of Internet Explorer 6.0 being run on a PC, it is likely that the vast majority of content accessed will include supported media types, but it is still possible to get blank boxes instead of images etc, because in addition to the named media file types supported by the client device 1, the message header, by virtue of the "*/*" is stating that any and all file types are supported by the client device 1.

If Internet Explorer being run by the client device 1 really wanted to be sure that the HTTP server 4 was to be informed of all the media types this would be a much longer accept header and indeed many less capable HTTP clients such as the mobile browsers with limited media type support would have accept headers listing all their supported media types, perhaps a few markup languages, script languages, several graphics types, and so on.

With each media type listed taking some 10+ characters for the simplest, then it only requires a modest number of explicit media types to be declared to mount up to several hundred bytes of data. A modest accept header of 128 bytes of data equates to 2K bits of data without any encoding. With a good 64 Kbits/sec link (low end of 3G, or about the highest performance GPRS) it takes ~30 ms to transfer this header across the network. Clearly as the request headers in the request 1 grow larger than this example size for the example speed (or the network speed is reduced) then the transfer time increases. Examples of 1 Kbyte headers (i.e. 8 Kbits) are not unrealistic in more complex devices.

Figure 2:
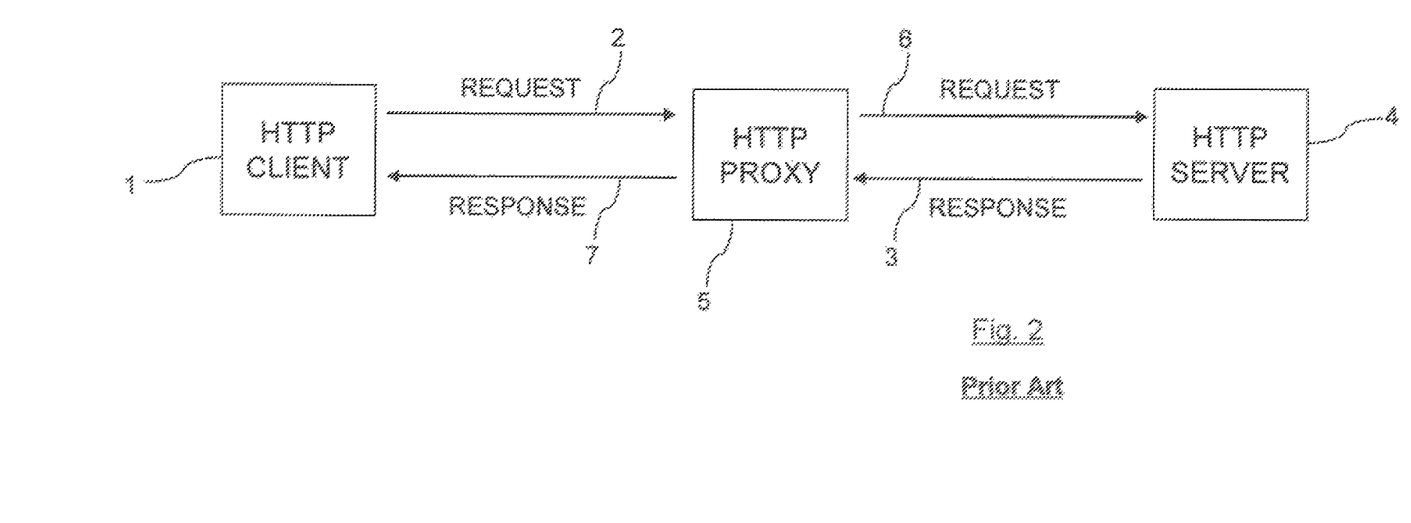

FIG. 2 shows an alternative prior art system which simply shows the system of FIG. 1 with an HTTP proxy server 5 in the path between the client device 1 and the server 4. The proxy server 5 adds no real value to the overall system, but may provide caching optimization. Moreover the proxy server 5 could perform HTTP header and content manipulation if it has a priori knowledge of the client device 1. The proxy server 5 transmits (or retransmits) a request 6 to the server 4 and ultimately transmits a response 7 to the client device 1.

Figure 3:
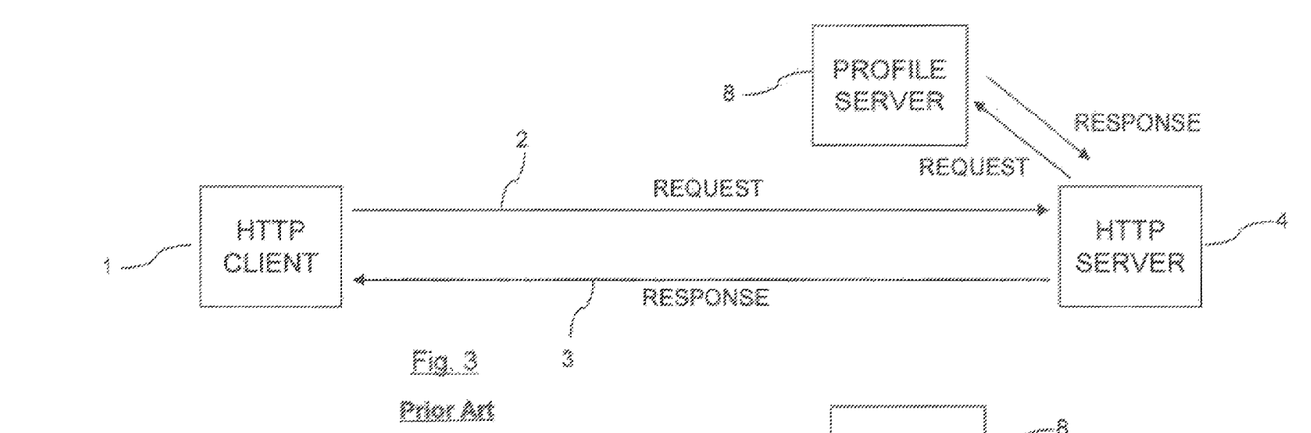
Figure 4:
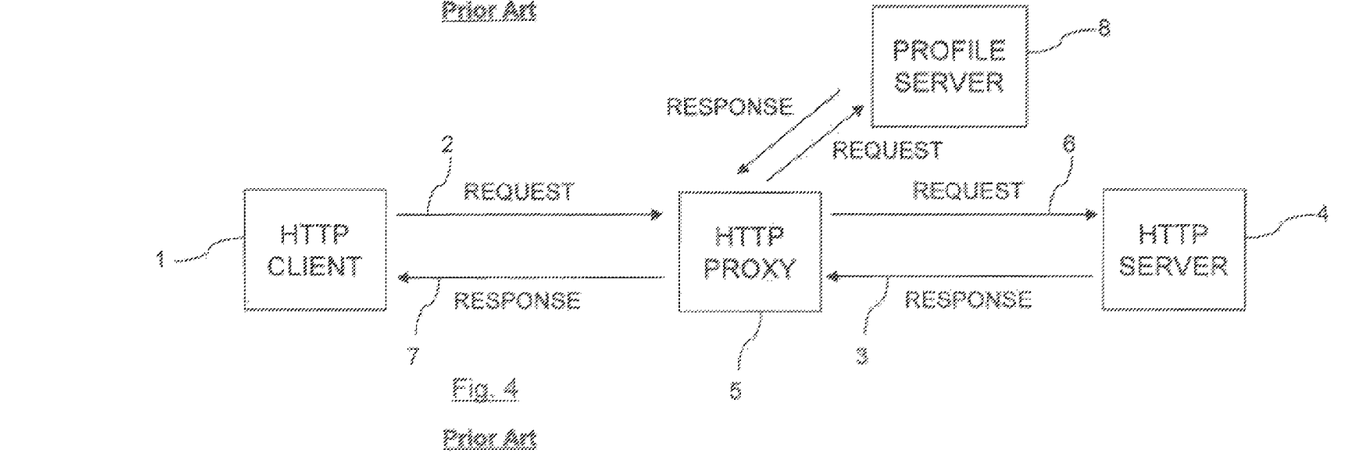

FIGS. 3 and 4 show further prior art systems, which show how UAPROF works. In essence, there is a specific extension header in the HTTP request 2, namely an x-wap-profile header, which acts as a pointer to a profile, which is stored by a profile server 8.

An example of the header might be "x-wap-profile: URI: HTTP://www.anyco.com/profiles/abc1.xml". The URI is a label, but it may also be, in many cases, a URL that allows the device profile to be fetched by the server 4 or a proxy server 5 and parsed. The profile stored by the profile server 8 is based on RDF, a rich XML language and when the profile is recalled it has its meaning extracted. This process of extracting the meaning from the profile requires specific additional code to be run on the server 4 (in the embodiment of FIG. 3) or the proxy server 5 (FIG. 4) to extract the supported media types, as well as other information, to provide a full list of supported media types for the server. With such a profile and universal support, the HTTP accept header could simply be */*.

The case of the proxy server 5 operating as in FIG. 2 and simply performing a relay to the server 4 (i.e. having no contact with the profile server 8) is not shown, but can be considered as covered by FIG. 3. The proxy server's value added function may be a front-end process of the server 4 itself. In general, caching in all respects is not shown and is considered an optimization rather than fundamental to the flow of requests and responses.

In a perfect world, the UAPROF approach addresses the problem of the accept header and obtaining a complete understanding of the device's characteristics and capabilities to provide content that matches these capabilities. However, the reality is that UAPROF has performance implications, for example in respect of the parsing of the documents that comprise the profiles. Additionally, problems when the URIs are not URLs, i.e. the profiles cannot be fetched or are invalid, can also occur. While the market is gradually adopting UAPROF, it will take time for it to become supported mainstream in all application servers.

Figure 5:
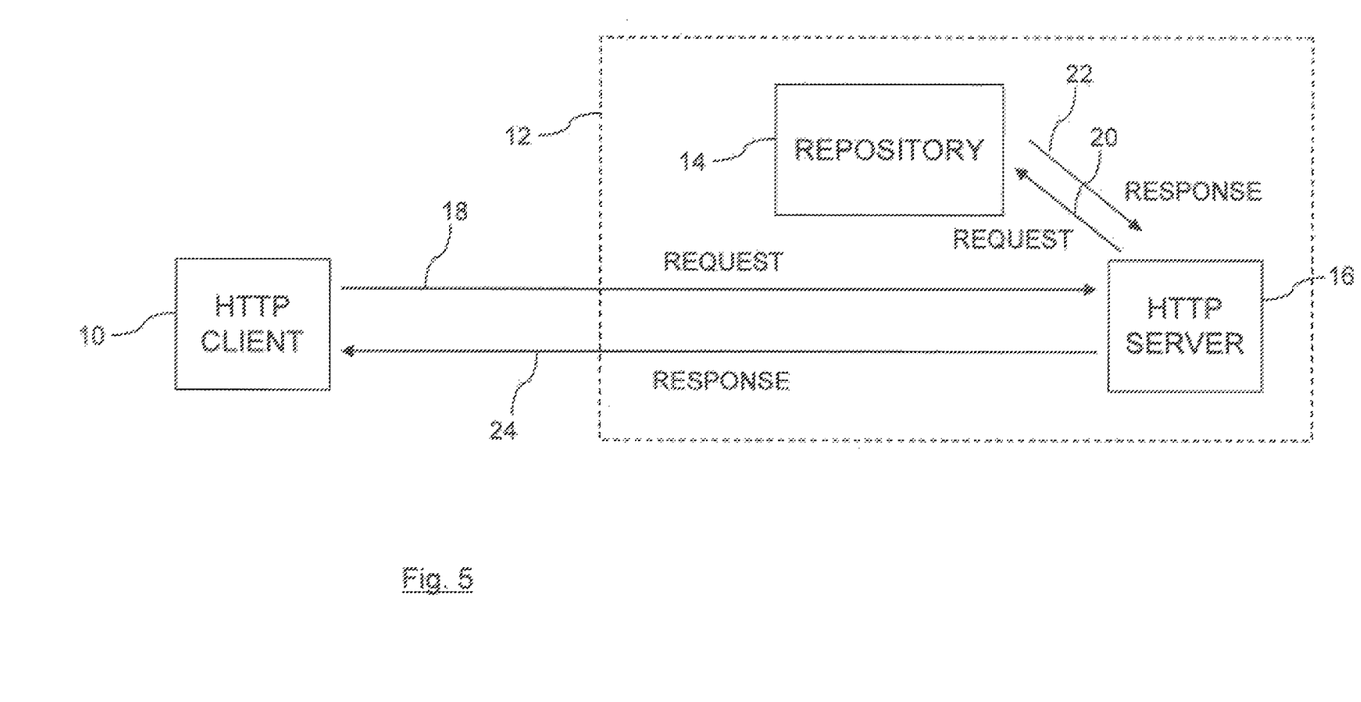
FIG. 5 is a schematic diagram of a first embodiment of a data processing system according to an example of the invention.
Figure 6:
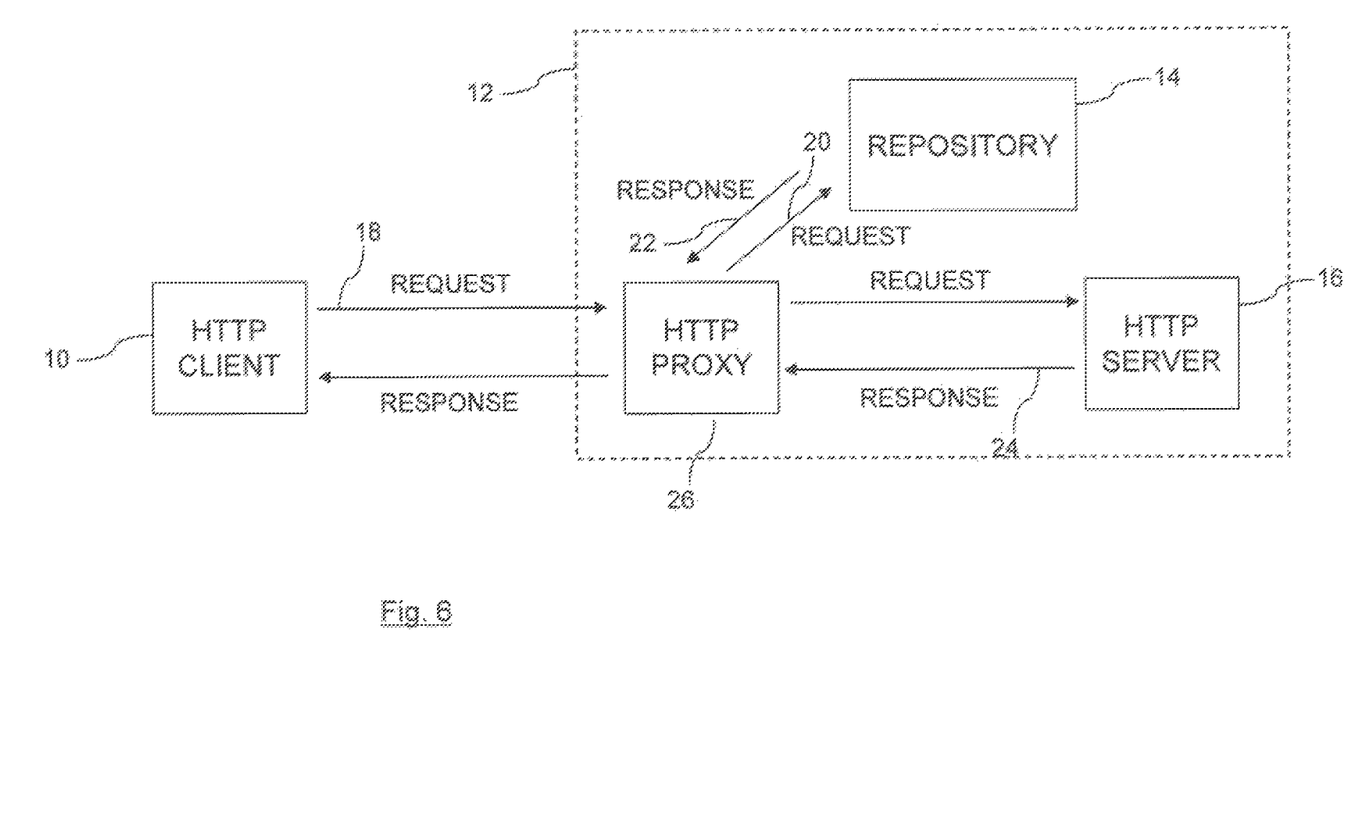
FIG. 6 is a schematic diagram of a second embodiment of the data processing system according to an example of the invention.

A system is needed that is simpler and more reliable and easily fits in with the existing technologies, so that it gains rapid traction and use. FIGS. 5 and 6 show the non proxy and proxy modes, for the data processing system, according to first and second embodiments of the invention. Again, as discussed above, the proxy server may be completely remote from the server or it may be a front-end process of the server itself.

FIG. 5 shows the data processing system, which comprises the client device 10 and a server system 12. The server system 12 comprises a repository 14 and a server 16. A network such as the Internet connects the client device 10 to the server system 12. The client device 10 is arranged to transmit the data request 18 to the server system 12, the data request 18 including a URL pointer to a repository address. The server system 12 receives the data request 18, and accesses the repository address defined by the URL pointer at the repository 14. The server 16 receives data from the repository address; the data defining a plurality of media file types supported by the client device 10.

The basic operation is simple. The HTTP request 18 contains the basic accept header information, the most basic being simply accept: */*, along with the new header and URL pointer or perhaps extending the use of the existing accept header to include the URL pointer, this URL pointer being to the repository 14 containing the full list of supported media types that would be declared in the accept header if the HTTP client device 10 wished to communicate its entire capability. Where an accept header value of */* is used along with a pointer to the repository 14 it is suggested the */* is given a HTTP q parameter of less than any q parameter associated with the URL provided list, to show that this is not as preferred as the declaration from the repository 14. For example, q=1.0 for the repository and q=0.5 for the */* advertisement of media support.

In FIG. 5, the HTTP request 18 containing the URL pointer to the repository 14 is received by the server 16 and the full list of supported media types that would otherwise be advertised via the accept header of the request 18 is fetched by requesting the information from the URL provided, i.e. from the accept header repository 14. The server 12 transmits a request 20 to the repository 14 and receives back a response 22 from the repository 14. The server system 12 is arranged to transmit a response 24 back to the client device 10, the response 24 adapted according to the data received from the repository address.

In FIG. 6, a proxy server 26 is performing the resolution of the full list of supported media by recognizing the header in the request, fetching the list of supported media from the repository 14 and manipulating the subsequent request header sent to the server 16 so that it includes all the supported media types.

Figure 7:
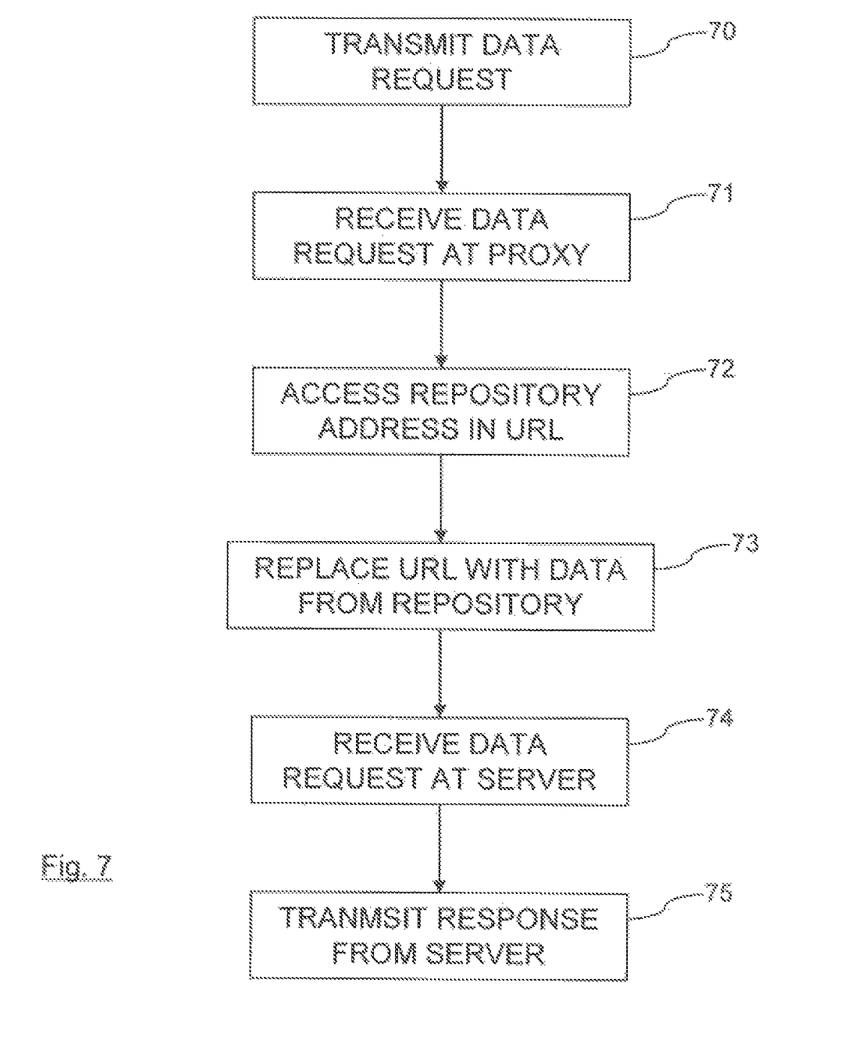
FIG. 7 is a flow diagram of a method of operating the data processing system of FIG. 6.

FIG. 7 summarizes the method of operating the data processing system, with regard to the embodiment of FIG. 6. The method comprises, firstly at step 70, transmitting the data request 18 from the client device 10 to the server system 12, the data request 18 including the URL pointer to the repository address. The data request 18 is received by the proxy server 26 (step 71). The next stage is step 72 which comprises accessing the repository address defined by the URL pointer, and receiving data from the repository address, the data defining the plurality of media file types supported by the client device 10.

The proxy server 26 is arranged to replace the URL pointer in the data request 18 with the data from the repository address. This is step 73 of the process. This request is then transmitted and received at the server 16, step 74, and the server 16 is arranged to transmit back a response to the client device 12 (via the proxy server 26), the response adapted according to the data received from the repository address.

The approach is usable for other information in the HTTP request header as well, but the accept header seems the most benefitted.

The benefits are simple. A small piece of additional code added to the most elementary front end of a web server or in a proxy server either as a front-end to the server or providing value add in the delivery chain can provide a full indication of the devices supported media types etc. The additional processing is minimal compared to UAPROF and the existing web servers, applications and other optimizations are not impacted at all. In fact this could exist alongside UAPROF allowing this lightweight approach for normal HTTP header information, not just the accept media types, Finally the currency of the information in the repository 14 pointed to by the HTTP requestor can be managed by various means such as OMA's XDM or device management etc. to ensure any new/updated media type support, for example, when adding plug-ins to browsers, is appropriately advertised.

Figure 8:
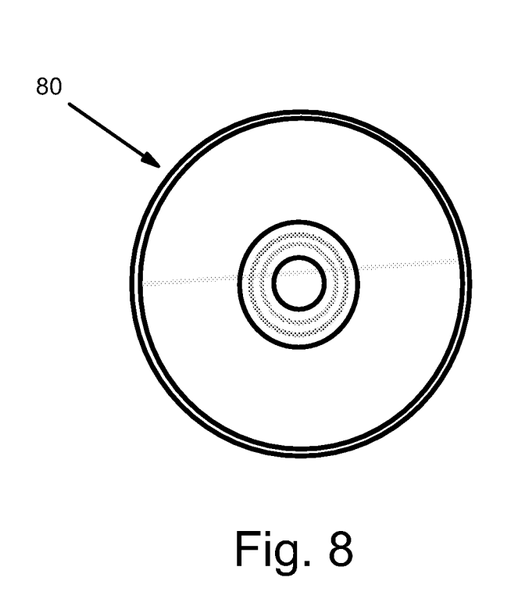
FIG. 8 is a representation of a computer readable medium on which is stored instructions implementing the methods of this invention.

FIG. 8 shows a computer readable medium, in the form of an optical disk 80, which carries computer executable code stored on the media accessibly to and executable on computer systems for implementing this invention. While here shown for purposes of illustration, it will be appreciated that the media may be an optical disk, a magnetic disk, a signal passed to the system, or some other form known to those of skill in the art. What is significant is that the appropriate instructions are produced and then provided to be deployed to and executed on computer systems which communicate through a network as described.

In the drawings and specifications there has been set forth a preferred embodiment of the invention and, although specific terms are used, the description thus given uses terminology in a generic and descriptive sense only and not for purposes of limitation.

What is claimed is:

1. An apparatus, comprising:
   a network;
   a client device connected to said network and arranged to transmit a data request which includes a URL pointer to a repository address and which defines one or more media file types supported by the client device, where the data request comprises an HTTP request, and the HTTP request comprises one of an extended accept header and an accept pointer header that includes the URL pointer to the repository address; and
   a server system connected to said network and arranged to receive the data request transmitted from said client device and responsive to receipt of the data request to access the repository address defined by the URL pointer, and to receive data from the repository address, the data defining a plurality of media file types supported by the client device, said server system comprising a repository and proxy server.

2. The apparatus according to claim 1, where the proxy server is arranged to replace the URL pointer in the data request with the data from the repository address.

3. The apparatus according to claim 1, where the server system is arranged to transmit a response to the client device, the response adapted according to the data received from the repository address.

4. A method, comprising:
   transmitting a data request from a client device over a network to a server system having a repository and a proxy server, the data request including a URL pointer to a repository address and data defining one or more media file types supported by the client device, where the data request has an HTTP request, and the HTTP request comprises one of an extended accept header and an accept pointer header that includes the URL pointer to the repository address;
   receiving the data request at the server system;
   accessing the repository address defined by the URL pointer; and
   receiving data from the repository address, the data defining a plurality of media file types supported by the client device.

5. The method according to claim 4, and further comprising replacing, at the proxy server, the URL pointer in the data request with the data from the repository address.

6. The method according to claim 4, and further comprising transmitting a response from the server system to the client device, the response adapted according to the data received from the repository address.

7. A method, comprising:
   producing computer executable program code;
   providing the program code to be deployed to and executed on computer systems;
   the program code comprising instructions which:
      transmit a data request from a client device over a network to a server system which has a repository and a proxy server, the data request including a URL pointer to a repository address and which defines one or more media file types supported by the client device, where the data request has an HTTP request, and the HTTP request comprises one of an extended accept header and an accept pointer header that includes the URL pointer to the repository address;
      receive the data request at the server system;
      access the repository address defined by the URL pointer; and
      receive data from the repository address, the data defining a plurality of media file types supported by the client device.

8. The method according to claim 7, and further comprising replacing, at the proxy server, the URL pointer in the data request with the data from the repository address.

9. The method according to claim 7, and further comprising transmitting a response from the server system to the client device, the response adapted according to the data received from the repository address.

* * * * *